(12) United States Patent
Takahashi et al.

(10) Patent No.: US 8,652,614 B2
(45) Date of Patent: Feb. 18, 2014

(54) OPTICAL ELEMENT AND METHOD FOR PRODUCING THE SAME

(75) Inventors: Michito Takahashi, Tokyo (JP); Sunao Miyazaki, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 336 days.

(21) Appl. No.: 12/819,570

(22) Filed: Jun. 21, 2010

(65) Prior Publication Data

US 2010/0330378 A1 Dec. 30, 2010

(30) Foreign Application Priority Data

Jun. 26, 2009 (JP) .................................. 2009-152182

(51) Int. Cl.
C03C 17/09 (2006.01)
C03C 17/40 (2006.01)
C03C 17/34 (2006.01)

(52) U.S. Cl.
CPC .................................. C03C 17/3417 (2013.01)
USPC ........... 428/192; 428/426; 428/432; 428/689; 428/701; 428/702; 501/45; 501/46; 501/47; 501/48; 501/73; 501/74; 427/166

(58) Field of Classification Search
None
See application file for complete search history.

(56) References Cited

U.S. PATENT DOCUMENTS

| | | | | | |
|---|---|---|---|---|---|
| 2,854,349 | A | * | 9/1958 | Dreyfus et al. | 428/333 |
| 4,363,852 | A | * | 12/1982 | Nakajima et al. | 428/432 |
| 4,363,879 | A | * | 12/1982 | Broemer et al. | 501/44 |
| 5,242,868 | A | * | 9/1993 | Hara | 501/44 |
| 5,476,717 | A | * | 12/1995 | Floch | 428/421 |
| 6,511,190 | B2 | * | 1/2003 | Ohgane | 359/856 |
| 2002/0036829 | A1 | * | 3/2002 | Ohgane | 359/586 |
| 2005/0196621 | A1 | * | 9/2005 | O'Shaughnessy et al. | 428/426 |
| 2006/0150682 | A1 | * | 7/2006 | Fujiwara et al. | 65/102 |
| 2007/0111875 | A1 | * | 5/2007 | Fujiwara | 501/47 |
| 2008/0085825 | A1 | * | 4/2008 | Suzuki et al. | 501/44 |
| 2010/0227753 | A1 | * | 9/2010 | Wolff et al. | 501/42 |
| 2012/0135199 | A1 | * | 5/2012 | Satou et al. | 428/172 |

FOREIGN PATENT DOCUMENTS

| | | | | |
|---|---|---|---|---|
| JP | 1-287501 | | 11/1989 | |
| JP | 2-178601 | | 7/1990 | |
| JP | A-H2-213803 | | 8/1990 | |
| JP | 03037142 A | * | 2/1991 | ............. C03C 27/10 |
| JP | 08277125 A | * | 10/1996 | ............. C03B 11/00 |
| JP | 9-159803 | | 6/1997 | |
| JP | 09159803 A | * | 6/1997 | |
| JP | A-2002-362943 | | 12/2002 | |
| JP | A-2005-213091 | | 8/2005 | |
| JP | 2006036560 A | * | 2/2006 | |
| JP | A-2008-249923 | | 10/2008 | |

* cited by examiner

*Primary Examiner* — David Sample

(74) *Attorney, Agent, or Firm* — Oblon, Spivak, McClelland, Maier & Neustadt, L.L.P.

(57) ABSTRACT

The present invention relates to an optical element comprising: a optical glass made of a phosphate glass or a fluorophosphate glass; and an optically functional film formed on a surface of the optical glass, wherein the optically functional film comprises two or more layers made of different materials, and the outermost surface layer thereof is made of a material(s) having low reactivity with phosphoric acid.

13 Claims, 9 Drawing Sheets

OPTICAL ELEMENT AND METHOD FOR PRODUCING THE SAME

TECHNICAL FIELD

The present invention relates to an optical element improved in environmental durability and a method for producing the same. Particularly, the present invention relates to an optical element suppressed in cloudiness and alteration thereof and improved in environmental durability when a phosphate glass or the like is used as a glass material, and to a method for producing the same.

BACKGROUND ART

Recently, attention has been paid to a direct press molding method in which an optical glass element such as a glass lens is press-molded, and which makes it possible to use the molded surface as it is without polishing or the like.

A glass material used in this press molding method is adjusted in composition so that the glass transition temperature thereof decreases, when it is intended to lower the press molding temperature as well as to improve processability. For example, in order to realize a particularly low temperature, it is known that a substantial decrease in the molding temperature can be realized by changing a composition system of glass from a silica glass to a phosphate glass.

However, the use of the phosphate glass results in extremely poor environmental durability. For this problem, even when the surface thereof is protected by forming an optically functional film such as an antireflection film, environmental durability becomes unfavorable in some cases.

Further, not apply only to glass materials for press molding, there are optical glasses include a phosphate glass containing phosphoric acid as a main component in order for giving priority to optical performance, and a fluorophosphate glass further containing fluorine into a phosphate glass. These have been used while having poor environmental durability, since priority is given to the optical performance. However, the poor environmental durability has posed a big problem in practical use.

When the glass materials having poor environmental durability as described above are put into practical use, improvements have been tried by methods in which (1) a dense film of alumina or the like is used as a first layer of an antireflection film to prevent water from entering (for example, see patent document 1), (2) the whole surface of a uncoated lens is coated with a film such as an antireflection film to eliminate an influence of water (for example, see patent document 2), (3) vacuum deposition, using IAD (ion beam assisted deposition), is used as a film-forming method of an antireflection film, instead of using usual vacuum deposition, (4) paying attention to a surface alteration layer of a molded article, a $SiO_2$ film is formed as a first layer on the surface alteration layer to enhance adhesion between a glass and an antireflection film (for example, see patent document 3), and the like. Incidentally, the first layer referred to in the above-mentioned background art examples (1) and (4) is a layer that is in contact with a core glass. The surface alteration layer referred to in the background art example (4) is the alteration layer generated by thermal influences during press molding described in patent document 3.

[Patent Document 1] JP-A-9-159803
[Patent Document 2] JP-A-2-178601
[Patent Document 3] JP-A-1-287501

SUMMARY OF THE INVENTION

However, in the method (1), no matter how densely the film is formed as the first layer, the glass is barely exposed at the side surface of the coated lens. Accordingly, it has been found that when the coated lens is placed in an atmosphere of high humidity, a phosphate component is eluted out from the side surface and reacts with an optical surface of the coated lens, resulting in the occurrence of cloudiness in the lens.

Further, in the method (2), the side surface of the coated lens is also covered with the film, so that the phosphate is not eluted out. This has therefore an effect of preventing cloudiness. However, the method employs dip coating, with which the whole surface can be coated at a time, and a chemical used in this method has a function of dissolving the glass. Accordingly, when the glass material having poor environmental durability is immersed therein, the glass surface becomes clouded, or the glass itself is dissolved away, in some cases. There has therefore been a limitation on the glass material to be applicable.

Furthermore, when the whole surface coating as described in (2) is tried to be performed by using a usual vapor deposition method, it is difficult to coat the side surface. In the case where only optically functional surfaces are coated, film formation is generally required only twice i.e., for front and back surfaces. However, addition of film formation on the side surface poses various problems such as a substantial increase in film forming operations as many as about 4 to 6 operations, necessity of special jigs and difficulty to ensure performance of the antireflection film of the optically functional surface.

In addition, the method (3) is effective for enhancing the adhesion of the film. However, the side surface of the coated lens is barely exposed, so that cloudiness occurs in the coated lens in some cases, similarly to the method (1). Further, in the IAD system, since the price of an apparatus is substantially expensive compared to the case of usual vapor deposition, it also causes a problem in terms of cost.

Furthermore, in the method (4), the $SiO_2$ film is a dense film similarly to an alumina film. However, no matter how densely the film is formed as the first layer, the glass is barely exposed at the side surface of the coated lens. Accordingly, when placed in an atmosphere of high humidity, a phosphate component is eluted out from the side surface and reacts with an optically surface of the coated lens, resulting in the occurrence of cloudiness in the coated lens. In addition, in the case of a monolayer film of $SiO_2$, the coated lens seems not to be clouded, but the characteristic (reflectance) as an antireflection film is inferior by about 2% compared to the case of usual magnesium fluoride. Accordingly, there is a disadvantage that the performance of the coated lens decreases.

As described above, the conventional methods have been insufficient for enhancing the environmental durability of the glass material having poor durability, particularly the phosphate glass, to a level completely sustainable for practical use, and further for ensuring the optical characteristics of the coated lens.

An object of the invention is to provide an optical element in which even though the optical element is made of a phosphate glass or a fluorophosphate glass having poor environmental durability, deterioration and alteration such as cloudiness do not occur on the surface thereof when it is maintained under high temperature and high humidity for a long period of time. Another object of the invention is to provide a method for producing the optical element.

In order to improve the environmental durability of optical elements using glass materials having poor environmental durability, particularly a phosphate glass, the present inventors have variously studied the formation of optically functional films represented by antireflection films. As a result, it has been found that it is extremely effective to employ a material having low reactivity with phosphoric acid as the outermost surface layer of the optically functional film.

That is, the invention provides the following optical elements [1] to [4] and production methods [5] to [9].

[1] An optical element comprising: a optical glass made of a phosphate glass or a fluorophosphate glass; and an optically functional film formed on a surface of the optical glass, wherein the optically functional film comprises two or more layers made of different materials, and the outermost surface layer thereof is made of a material(s) having low reactivity with phosphoric acid.

[2] The optical element according to [1], wherein the outermost surface layer of the optically functional film is an oxide film.

[3] The optical element according to [2], wherein the oxide film is made of at least one material selected from the group consisting of $SiO_2$, $Al_2O_3$, $Y_2O_3$, $La_2O_3$, $HfO_2$, $Ta_2O_5$, $TiO_2$, $ZrO_2$ and $Nb_2O_5$.

[4] The optical element according to any one of [1] to [3], wherein the outermost surface layer of the optically functional film has a film thickness of 5 nm to 450 nm.

[5] A method for producing an optical element comprising forming an optically functional film comprising two or more layers made of different materials and sequentially laminated, on a surface of an optical glass made of a phosphate glass or a fluorophosphate glass, wherein the outermost surface layer of the optically functional film is made of a material(s) having low reactivity with phosphoric acid.

[6] The method for producing an optical element according to [5], wherein the optically functional film is formed by a vacuum vapor deposition film forming method using an electron gun evaporation source.

[7] The method for producing an optical element according to [6], wherein the optically functional film is formed by a plasma-assist or ion-assist vapor deposition film forming method using an electron gun evaporation source.

[8] The method for producing an optical element according to [5], wherein the optically functional film is formed by a sputtering film forming method.

[9] The method for producing an optical element according to any one of [5] to [8], wherein the optical glass made of a phosphate glass or a fluorophosphate glass is obtained by softening an optical glass forming material by heating, and pressing it with a mold.

According to the optical element of the invention, the optically functional film formed on the surface of the glass optical element using the phosphate glass or the fluorophosphate glass as a glass material is not corroded even in an atmosphere of high temperature and high humidity, and the occurrence of cloudiness can be effectively suppressed.

Further, according to the method for producing an optical element of the invention, the optical element improved in environmental durability, in which cloudiness does not occur even in an atmosphere of high temperature and high humidity, can be produced inexpensively, utilizing a conventional production method.

DESCRIPTION OF REFERENCE NUMERALS AND SIGNS

| | |
|---|---|
| 1 | Optical element |
| 2 | Core glass |

-continued

| | |
|---|---|
| 3 | Optically functional film |
| 11 | Vacuum chamber |

Incidentally, the glass materials for the core glass 2 include, for example, phosphate glasses or fluorophosphate glasses having compositions (% by mass) shown in Tables 1 to 3. For these glass materials, refractive index (nd), Abbe number (vd), glass transition point (Tg) and yield point (At) are also shown together.

TABLE 1

| | Glass Material No. | | | | | |
|---|---|---|---|---|---|---|
| | 1 | 2 | 3 | 4 | 5 | 6 |
| $P_2O_5$ | 49.50 | 45.00 | 50.00 | 48.90 | 51.00 | 52.80 |
| $B_2O_3$ | 0.93 | | 1.50 | | 0.02 | |
| $Al_2O_3$ | 2.00 | 1.91 | 5.25 | 9.92 | 2.68 | 2.30 |
| $Li_2O$ | 1.74 | 1.70 | 1.50 | 3.93 | 2.78 | 3.81 |
| $Na_2O$ | 4.00 | 8.40 | | 9.87 | 1.87 | 0.04 |
| $K_2O$ | 6.53 | 6.45 | 6.59 | 8.25 | | |
| ZnO | 30.40 | 36.30 | 29.30 | 7.78 | 25.60 | 25.50 |
| BaO | 4.60 | | 2.15 | 9.70 | 7.64 | 9.91 |
| CaO | | | 3.01 | | 3.60 | 4.87 |
| SrO | | | | 0.05 | 1.15 | |
| MgO | | | | | 1.48 | |
| $SiO_2$ | 0.34 | 0.26 | 0.67 | 0.03 | | 0.37 |
| $ZrO_2$ | | | | 1.45 | 0.88 | |
| $La_2O_3$ | | 0.01 | | | 1.08 | 0.44 |
| $WO_3$ | | | | | 0.18 | |
| $Nb_2O_5$ | | 0.01 | | | 0.08 | |
| $Sb_2O_3$ | | | | 0.10 | | |
| nd | 1.56455 | 1.56266 | 1.55880 | 1.54250 | 1.59170 | 1.59087 |
| vd | 60.8 | 60.0 | 62.5 | 62.9 | 60.7 | 62.3 |
| Tg(° C.) | 350 | 349 | 381 | 343 | 390 | 382 |
| At(° C.) | 373 | 372 | 407 | 363 | 415 | 404 |

-continued

| | |
|---|---|
| 12 | Heater |
| 13 | Dome |
| 14 | Vacuum exhaust outlet |
| 15 | Gas introduction port |
| 16 | Evaporation source |
| 17 | Electron gun |

MODE FOR CARRYING OUT THE INVENTION

The optical element of the invention comprises an optically functional film formed on the surface of optical glass made of a phosphate glass or a fluorophosphate glass, as described above. The optically functional film is a lamination of two or more layers formed of different materials, and characterized in that the outermost surface layer thereof is constituted by a material(s) having low reactivity with phosphoric acid.

The invention will be described in detail below with reference to the drawings.

Figure 1:
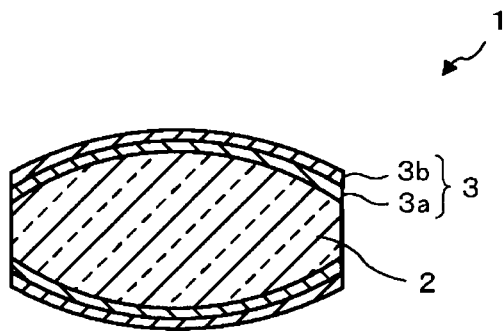
FIG. 1 is a cross-sectional view showing an embodiment of an optical element of the invention.

FIG. 1 is a cross-sectional view showing a schematic constitution of one embodiment of the optical element of the invention. Here, the optical element 1 comprises a core glass 2 and an optically functional film 3 composed of two layers of a first layer film 3*a* formed on the surface of the core glass 2 and an outermost surface layer (second layer film) 3*b*.

Here, the core glass 2 is made of a phosphate glass or a fluorophosphate glass, and obtained by processing into an optical glass. This core glass 2 is obtained by a known method for producing an optical glass. The optical glass (uncoated lens) can be obtained by cutting, rounding, lapping, precise lapping, polishing and centering a glass material or pressing a glass material by molding and centering it.

TABLE 2

| | Glass Material No. | | | |
|---|---|---|---|---|
| | 7 | 8 | 9 | 10 |
| $P_2O_5$ | 47.14 | 45.42 | 37.72 | 37.78 |
| $B_2O_3$ | 9.91 | 9.60 | 4.63 | 4.38 |
| $Al_2O_3$ | 2.39 | 2.83 | 3.76 | 3.45 |
| $Li_2O$ | 4.38 | 4.50 | 3.75 | 3.61 |
| ZnO | 1.32 | | | |
| BaO | 29.78 | 16.79 | 36.22 | 35.61 |
| CaO | 2.72 | 7.85 | 6.62 | 6.78 |
| SrO | 0.33 | 6.65 | | |
| MgO | 0.46 | 6.31 | 4.76 | 4.88 |
| $La_2O_3$ | 1.57 | | 1.20 | |
| $Gd_2O_3$ | | | 1.34 | 3.51 |
| nd | 1.59216 | 1.59201 | 1.62010 | 1.61881 |
| vd | 67.2 | 67.0 | 63.5 | 63.9 |
| Tg(° C.) | 484 | 499 | 521 | 508 |
| At(° C.) | 517 | 541 | 561 | 555 |

TABLE 3

| | Glass Material No. | |
|---|---|---|
| | 11 | 12 |
| $P_2O_5$ | | 6.10 |
| $AlF_3$ | 12.45 | 31.40 |
| $MgF_2$ | 5.13 | 10.88 |
| $CaF_2$ | 16.06 | 15.96 |
| $BaF_2$ | 14.43 | 14.59 |
| $SrF_2$ | 25.86 | 19.96 |
| $Al(PO_3)_3$ | 26.08 | |
| NaF | | 1.08 |
| nd | 1.49700 | 1.43425 |
| vd | 81.6 | 95.0 |
| Tg(° C.) | 465 | 428 |
| At(° C.) | 486 | 464 |

The glass materials shown in Table 1 are glass materials containing phosphoric acid as a main component so as to have a decreased the glass transition temperature for the press molding so that they can be formed at low temperature. With respect to the components thereof, $P_2O_5$ is from 45 to 53% by mass, ZnO is from 7 to 37% by mass, $K_2O$ is from 0 to 9% by mass, $Na_2O$ is from 0 to 10% by mass, $Li_2O$ is from 1 to 4% by mass, $Al_2O_3$ is from 1 to 10% by mass, BaO is from 0 to 10% by mass, CaO is from 0 to 5% by mass, and other minor components ($B_2O_3$, $SiO_2$, $ZrO_2$, $Sb_2O_3$, SrO, $La_2O_3$, MgO, $WO_3$ and $Nb_2O_5$) are each from 0 to 2% by mass. Further, the refractive index (nd) ranges from 1.54 to 1.60, and the Abbe number (vd) ranges from 59 to 63.

The glass materials shown in Table 2 are glass materials originally containing phosphoric acid as a main component from the standpoint of optical characteristics but further adjusted so as to be formable at low temperature by decreasing the glass transition temperature for press molding. With respect to the components thereof, $P_2O_5$ is from 36 to 48% by mass, $B_2O_3$ is from 4 to 11% by mass, $Li_2O$ is from 3 to 5% by mass, BaO is from 15 to 38% by mass, CaO is from 2 to 9% by mass, MgO is from 0 to 7% by mass, SrO is from 0 to 8% by mass, $Al_2O_3$ is from 2 to 4% by mass, and other minor components (ZnO, $La_2O_3$ and $Gd_2O_3$) are each from 0 to 4% by mass. Further, the refractive index (nd) ranges from 1.59 to 1.63, and the Abbe number (vd) ranges from 63 to 68.

The glass materials shown in Table 3 are usual optical glasses and not for press molding. However, they are fluorophosphates glasses used for specific applications from the standpoint of optical characteristics, containing phosphoric acid and further containing fluorine. Environmental durability is significantly poor, since priority is given to optical characteristics. With respect to the components thereof, $P_2O_5$ is from 0 to 7% by mass, NaF is from 0 to 2% by mass, $AlF_3$ is from 12 to 32% by mass, $MgF_2$ is from 5 to 11% by mass, $CaF_2$ is from 15 to 17% by mass, $SrF_2$ is from 19 to 26% by mass, $Al(PO_3)_3$ is from 0 to 27% by mass, and $BaF_2$ is from 14 to 15% by mass. Further, the refractive index (nd) ranges from 1.43 to 1.50, and the Abbe number (vd) ranges from 81 to 96.

As described above, the material itself of this core glass 2 is not so endurable under severe circumstances such as high temperature and high humidity. Further, although there have hitherto been examples in which an antireflection film or the like is formed as an optically functional film on a surface thereof, such a film has little effect for improving environmental durability. Optical element using the phosphate glass or the fluorophosphate glass as the glass material has never been used for applications under severe circumstances.

For example, typical examples of the antireflection films include a film of which the outermost surface layer is magnesium fluoride ($MgF_2$). For the phosphate glass on which this antireflection film was formed, an environmental durability test was performed. As a result, the surface of the glass was corroded to generate cloudiness.

The present inventors studied a mechanism of the cloudiness of the optical elements. As a result, it was ascertained that the cloudiness is generated by the following steps 1 to 4:

Step 1: Phosphoric acid in the phosphate glass is eluted out from a side surface of the optical element under conditions of high temperature and high humidity;

Step 2: Eluted phosphoric acid adheres to the surface of the optically functional film of the optical element, i.e., the outermost surface layer;

Step 3: Phosphoric acid which has adhered to the surface reacts with magnesium fluoride employed in the outermost surface layer of the optically functional film; and Step 4: Magnesium fluoride deteriorates to generate the cloudiness on the surface of the optical element.

The above was revealed as a result of a detailed analysis of the optical element deteriorated by the environmental durability test. Specifically, when a composition analysis of the surface of the coated lens in which the cloudiness was generated was performed in detail from the surface side, it was revealed that deterioration occurred only in the outermost surface layer, and did not occur at all in the next layer.

That is, in the phosphate glass or the fluorophosphate glass, the cloudiness generation has been caused by the outermost surface layer of the glass material. The present inventors have elucidated the cause of deterioration of environmental durability for the first time.

Then, the present inventors have found that the optical element improved in environmental durability can be produced by providing, as the optically functional film 3, a lamination of two or more layers formed of different materials on the surface (optically functional surface) of the core glass 2 composed of phosphate glass or fluorophosphate glass, and further, designing the outermost surface layer 3b of the optically functional film so as to be made of a material(s) having low reactivity with phosphoric acid.

Here, the optically functional films 3 include an antireflection film, an IR cut filter, a reflection film, a protective film, a band-pass filter, a low-cut filter and the like. When the outermost surface layer 3b is constituted as described below, the other film constitutions need only to meet predetermined standards, using known materials so as to exhibit desired functions.

Further, although the optically functional film 3 shown in FIG. 1 is constituted by the two-layer film, it may be a film in which two or more layers are laminated. These layers are formed of different materials. A predetermined material is used for the outermost surface layer described below, so that at least one of layers formed inside the outermost surface layer needs only to be formed of a material different from that of the outermost surface layer. Further, when three or more layer films are formed, the films adjacent to each other are preferably formed of different materials. However, it is unnecessary that all materials are different with no overlaps, and some layers may be formed using the same material.

Incidentally, the optically functional film 3 is formed on the optically functional surface of the core glass 2, and specifically it is partially formed on the surface of the core glass 2 so that the phosphate glass or the fluorophosphate glass is exposed at the side surface thereof. In this way, the optically functional film may be formed only on the necessary optically functional surface, and not on the side surface having no optical meaning. This can reduce the cost and time for the production. Further, the invention suitably exhibits the effect thereof when the phosphate glass or the fluorophosphate glass exists in such a partially exposed state.

Then, the outermost surface layer 3b of the optically functional film will be described. In the invention, the material having low reactivity with phosphoric acid and forming the outermost surface layer is preferably an oxide, and more preferably a metal oxide. Examples thereof include $SiO_2$, $Al_2O_3$, $Y_2O_3$, $La_2O_3$, $HfO_2$, $Ta_2O_5$, $TiO_2$, $ZrO_2$, $Nb_2O_5$ and the like. These oxides exemplified are good vapor deposition materials having high purity and low gas release, and can provide stable and good optical characteristics.

The outermost surface layer 3b is formed of at least one of the above-mentioned materials. That is, the outermost surface layer may be either a layer using one of the above-mentioned materials or a layer using a mixture of two or more thereof.

Above all, it is suitable to use at least one material selected from $SiO_2$, $Al_2O_3$, $TiO_2$ and $ZrO_2$.

Incidentally, the term "the material having low reactivity with phosphoric acid" as used herein means a material with which no cloudiness is observed when the material is coated with an orthophosphoric acid aqueous solution having a concentration of 85% by mass, maintained at 60° C. for 100 hours, followed by removal of the orthophosphoric acid aqueous solution applied, and observed at an illuminance of 6,000 lux.

Then, in the invention, such a material having low reactivity with phosphoric acid is used as the outermost surface layer 3b of the optically functional film 3. Accordingly, good durability is shown against phosphoric acid which is generated from the core glass 2 and causes cloudiness, and the optically functional film 3 can stably function.

The material employed for this outermost surface layer of the film needs only to be a material which does not react with phosphoric acid, but the film must exhibit the performance as the optically functional film. For example, an antireflection film is formed by alternately forming a material having a low reflectance and a material having a high reflectance, and generally, a material having a relatively low reflectance is used for the outermost surface layer.

By the way, the present inventors have found that even when the material having a high reflectance is used for the outermost surface layer, the optically functional film, which is represented by satisfying the desired performance, is realized by properly adjusting the film thickness of the outermost surface layer and performing the whole film design. Materials having low reactivity with phosphoric acid and satisfying such conditions are explored. As a result, it has been revealed that the materials given above can be used. Incidentally, the above-mentioned film design only needs to determine a film constitution having desired spectral characteristics by an optimization technique using an optical thin film design software such as TFCalc, OPTCALC, Optilayer, or Macleod, similarly to conventional methods, after the film thickness of the outermost surface layer has been determined in order to suppress alteration of the optically functional film 3.

The film thickness of the outermost surface layer 3b of this optically functional film 3 can be arbitrarily set as long as not impairing the performance the optically functional film 3. However, it preferably ranges from 5 nm to 450 nm. When it is less than 5 nm, there is a possibility that the denseness of the film decreases to make insufficient the characteristic of preventing the reaction between phosphoric acid and the optically functional film. On the other hand, when it exceeds 450 nm, the characteristics of the antireflection film deteriorates, and cracks become liable to occur in the film. This is therefore unfavorable. In the case exceeding 450 nm, it takes additional time to form the film, which poses a problem also from an economical standpoint.

At this time, when light in an infrared region is to be transmitted, the outermost surface layer 3b is preferably formed with a thickness of exceeding 300 nm to 450 nm. When light in a visible region is to be transmitted, on the other hand, the outermost surface layer 3b is preferably formed with a thickness of 300 nm or less.

Incidentally, when the antireflection film is formed as the optically functional film, the thickness of the outermost surface layer 3b preferably ranges from 8 nm to 200 nm, in order to exhibit best the characteristics thereof. It is advantageous to form the film as thick as possible for stably exhibiting the effect of preventing surface alteration due to phosphoric acid.

Incidentally, the film thickness of the outermost surface layer 3b described above can comply with a region other than that region, for example, the cases used in an ultraviolet region or the like, a filter for cutting light having a specific wavelength (an IR cut filter or the like), or the like, by appropriately adjusting the constitution and the film thickness of the optically functional film, not limited to the above-mentioned film thickness ranges.

The method for producing an optical element of the invention will be described below.

The optical element of the invention can be obtained by normally forming two or more layers composed of different materials on the surface of the core glass 2 obtained by a conventionally known method, for example, a method of cutting, rounding, lapping, precise lapping, polishing and centering the glass material or a method of softening the optical element molding material by heating, pressing it with a mold and performing centering as needed. In that case, the outermost surface layer of the optically functional film just has to be formed of the material having low reactivity with phosphoric acid.

In order to form the optically functional film on the optically functional surface of the above-mentioned phosphate glass or fluorophosphate glass, known film forming methods can be used. For example, it is advantageous in cost to perform film formation by a vacuum deposition film forming method of vaporizing a deposition material by resistance heating, electron beams or the like. Further, in the case of performing film formation by a vacuum deposition, it is preferred to use a plasma-assist or ion-assist deposition film forming method in that the film formation can be efficiently performed. Further, in addition to the vacuum deposition, known film forming methods such as sputtering and CVD can also be used.

Figure 2:
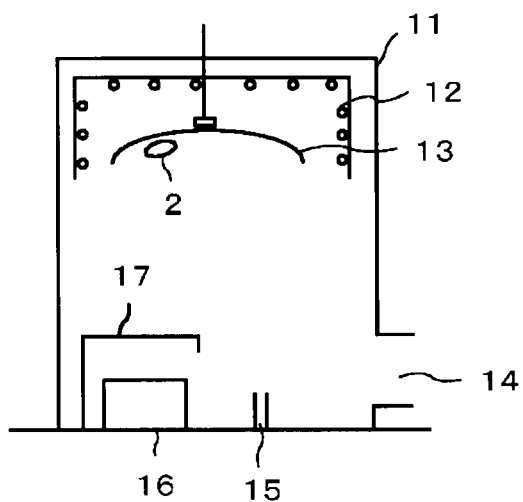
FIG. 2 is a schematic block diagram showing a vacuum deposition apparatus used in forming an optically functional film according to the invention.

A method for forming the optically functional film 3 on the core glass 2 by the vacuum deposition method will be described below with reference to FIG. 1 and FIG. 2. Here, FIG. 2 is a view showing a schematic constitution of a vacuum deposition apparatus.

First, the core glass 2 is washed with an ultrasonic washing machine by a usual glass washing process. Thereafter, the core glass 2 is set to a dome 13 for film formation, and placed in a vacuum chamber 11. The core glass 2 is heated at 150° C. to 350° C. with a heater 12 while evacuating the inside of the chamber through a vacuum exhaust outlet 14. The heating temperature can be selected depending on the glass transition temperature of the core glass 2 and adjusted to a temperature 100° C. or more lower than the glass transition temperature.

Incidentally, the reason for heating at the time of film formation is to increase the denseness of the film. When not heated, the film unfavorably becomes a spongy state. After evacuation is performed until the degree of vacuum in the vacuum chamber 11 reaches $1\times10^{-3}$ Pa or less, various materials as an evaporation source 16 are evaporated with an electron gun 17 to form the film which becomes a part (the first layer film 3a) of the optically functional film 3, on the core glass 2. Incidentally, oxygen is introduced as needed from a gas introduction port 15 during film formation so that a vapor-deposited oxide becomes a desired oxidized state.

Then, the outermost surface layer 3b is formed by using the material having low reactivity with phosphoric acid by a similar operation, thereby forming the optically functional film 3. Also when the optically functional film is constituted by three or more layer films, films composed of predetermined materials are in turn laminated similarly depending on the film design, and finally, film formation is performed so that the film composed of the material having low reactivity with phosphoric acid forms the outermost surface layer, thereby forming the optically functional film 3. In the optically functional film 3 thus obtained, the outermost surface layer is formed of the material having low reactivity with phosphoric acid, and such a material preferably is at least one selected from the group consisting of $SiO_2$, $Al_2O_3$, $Y_2O_3$, $La_2O_3$, $HfO_2$, $Ta_2O_5$, $TiO_2$, $ZrO_2$ and $Nb_2O_5$.

The film constitution is previously designed and decided so as to meet the characteristics required for usual coated lenses and to sufficiently exhibit the functions as the optically functional film, on the condition that the material having low reactivity with phosphoric acid is formed into the outermost surface layer.

The film thickness of this outermost surface layer can be arbitrarily set as long as not impairing the performance of the optically functional film. It is preferably from 5 nm to 450 nm, and more preferably from 8 nm to 200 nm in that the characteristics of the optically functional film become best. When it is less than 5 nm, the characteristic of preventing the reaction between phosphoric acid and the optically functional film is insufficient. On the other hand, when it exceeds 450 nm, the effect of suppressing alteration deteriorates, and cracks become liable to occur in the film. This is therefore unfavorable. Further, it takes time to form the film, which poses a problem also from an economical standpoint.

At this time, when light in an infrared region is allowed to pass through, the outermost surface layer is preferably formed to a thickness of exceeding 300 nm to 450 nm. When light in a visible region is allowed to pass through, the layer is preferably formed to a thickness of 300 nm or less.

The film thickness of the outermost surface layer can comply with a region other than that region, for example, the case used in an ultraviolet region or the like, a filter for cutting light having a specific wavelength, or the like, by appropriately adjusting the constitution and the film thickness of the optically functional film, not limited to the above-mentioned film thickness range.

EXAMPLES

Embodiments of the invention will be specifically described below with reference to examples.

<Preparation of Optical Glass (Core Glass)>

A raw material was cut out from an optical glass block (plate material) containing phosphoric acid as a main component, which has each of the compositions shown in Tables 1 to 3, and processed to a core glass 2 having a double convex lens form with an external diameter of 7 mm, a center thickness of 4.3 mm, a curvature radius of 7 mm for both surfaces, an edge thickness of 2.424 mm and a volume of 0.13 cc by performing grinding, polishing and centering by usual methods.

<Formation of Antireflection Film (Optically Functional Film)>

The resulting core glass 2 was washed with an ultrasonic washing machine by a usual glass washing process, and then, an optically functional film 3 functioning as an antireflection film of the invention was formed with a vacuum vapor deposition apparatus shown in FIG. 2. FIG. 1 is a cross-sectional view showing an embodiment of an optical element of the invention, and the core glass 2 of the optical element is formed of each of optical glasses containing phosphoric acid, which are shown in Tables 1 to 3. The optically functional film 3 is a film in which the outermost surface layer film thereof is composed of a material having low reactivity with phosphoric acid.

First, the core glass 2 was set to a dome 13 for film formation, and placed in a vacuum chamber 11. The core glass 2 was heated at 150° C. to 350° C. with a heater 12 while evacuating the inside of the chamber through a vacuum exhaust outlet 14. The heating temperature was selected depending on the glass transition temperature of the glass. That is, it was adjusted to a temperature 100° C. or more lower than the glass transition temperature.

After evacuation is performed until the degree of vacuum in the vacuum chamber 11 reaches $1 \times 10^{-3}$ Pa or less, various materials as an evaporation source were evaporated with an electron gun 17, thereby in turn laminating two or more layers formed of different materials on the core glass 2. Here, for the films on the core glass 2, the film composed of the material having low reactivity with phosphoric acid was finally formed as the outermost surface layer to prepare the antireflection film 3. This antireflection film 3 was formed by determining the material constituting the outermost surface layer thereof, and on the condition thereof, previously designing the film constitution so as to meet the characteristics required for usual coated lenses.

<Design of Antireflection Film (Optically Functional Film)>

The antireflection film as one embodiment of the invention will be described in detail. For the case where the antireflection film of the invention was formed using a glass of glass material No. 7 having an nd of 1.59216 in Table 2 as a typical example, by the above-mentioned forming method of the antireflection film (optically functional film), characteristics thereof were studied below, including conventional examples. Incidentally, in Tables 4 to 28 described below, a film directly formed on a core glass was numbered as a first layer, and subsequent films were in turn numbered as a second layer, a third layer, and an N layer in the laminated order. The N layer taking the maximum number is the outermost surface layer, and AIR indicates air (the outermost surface layer is in contact with air).

Conventional Example 1

Figure 3:
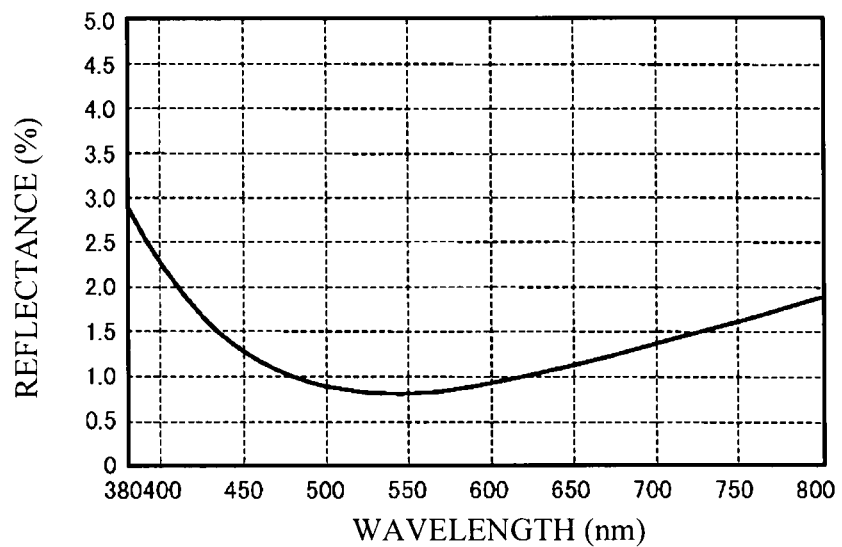
FIG. 3 is a graph showing the relationship between the wavelength and the spectral reflectance in Conventional Example 1.

The constitution of an antireflection film in which a monolayer film of magnesium fluoride ($MgF_2$) was formed on the surface of the core glass is shown in Table 4, and the reflection characteristic thereof is shown in FIG. 3. This characteristic is hereinafter called the single characteristic.

TABLE 4

| | Vapor-Deposited Material | Actual Thickness (nm) |
| --- | --- | --- |
| First Layer | $MgF_2$ | 97.62 |
| | AIR | |

Comparative Example 1

Figure 4:
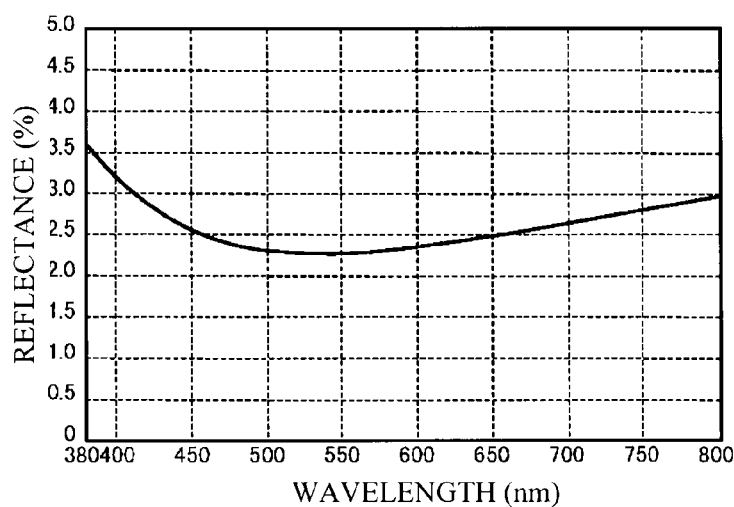
FIG. 4 is a graph showing the relationship between the wavelength and the spectral reflectance in Comparative Example 1.

The constitution of an antireflection film in which a monolayer film of silicon dioxide ($SiO_2$) was formed on the surface of the core glass is shown in Table 5, and the reflection characteristic thereof is shown in FIG. 4.

TABLE 5

| | Vapor-Deposited Material | Actual Thickness (nm) |
| --- | --- | --- |
| First Layer | $SiO_2$ | 89.95 |
| | AIR | |

As known from FIG. 4, in monolayer coating of $SiO_2$, the reflectance increases as high as 0.5% or more, compared to the single characteristic. This is unfavorable state as an antireflection film characteristic.

Examples 1 to 3

Figure 5:
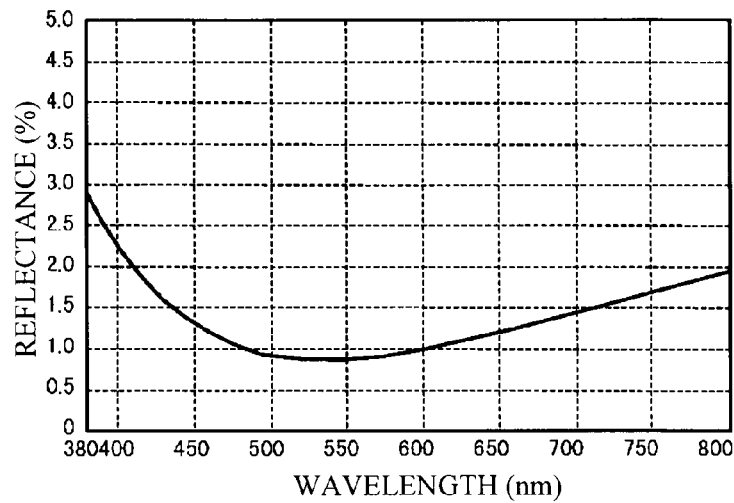
FIG. 5 is a graph showing the relationship between the wavelength and the spectral reflectance in Example 1.
Figure 6:
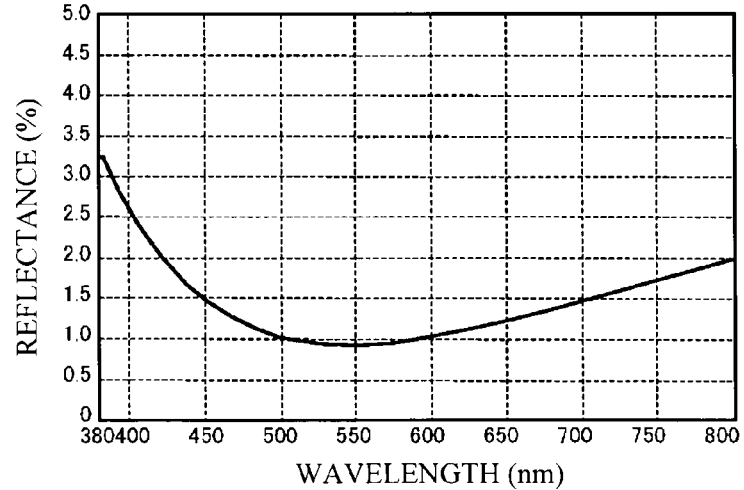
FIG. 6 is a graph showing the relationship between the wavelength and the spectral reflectance in Example 2.
Figure 7:
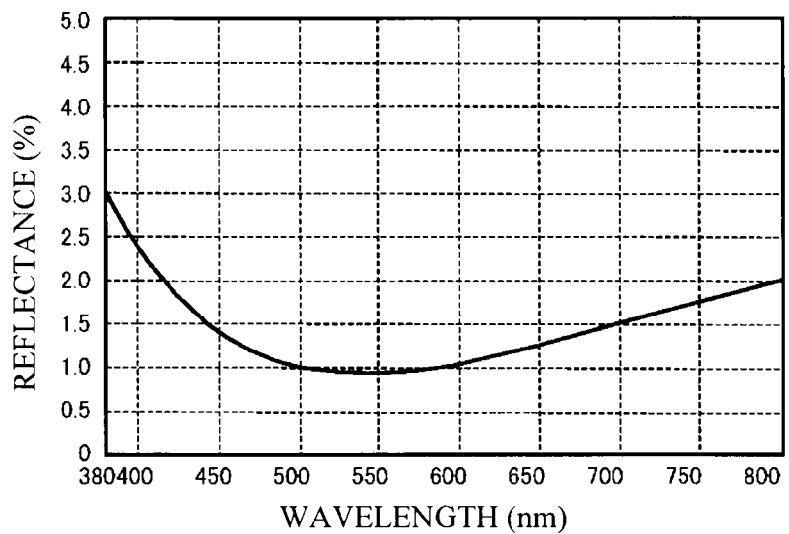
FIG. 7 is a graph showing the relationship between the wavelength and the spectral reflectance in Example 3.

The constitutions of antireflection films designed so as to bring their characteristics near to the single characteristic and each formed on the surface of the core glass so that the outermost surface layer was formed of silicon dioxide ($SiO_2$) or alumina ($Al_2O_3$) are shown in Tables 6 to 8, and the reflection characteristics thereof are shown in FIGS. 5 to 7, respectively. Further, an antireflection film having the constitution shown in Table 6 and having an outermost layer film thickness of 7 nm was also produced (Example 1-2).

TABLE 6

| | Vapor-Deposited Material | Actual Thickness (nm) |
|---|---|---|
| First Layer | $MgF_2$ | 84.93 |
| Second Layer | $SiO_2$ | 9.18 |
| | AIR | |

TABLE 7

| | Vapor-Deposited Material | Actual Thickness (nm) |
|---|---|---|
| First Layer | $MgF_2$ | 82.00 |
| Second Layer | $Al_2O_3$ | 8.19 |
| | AIR | |

TABLE 8

| | Vapor-Deposited Material | Actual Thickness (nm) |
|---|---|---|
| First Layer | $Al_2O_3$ | 8.19 |
| Second Layer | $MgF_2$ | 75.17 |
| Third Layer | $SiO_2$ | 18.36 |
| | AIR | |

As shown in FIGS. 5 to 7, the two or more layer film constitutions had small deviations from the single characteristic, compared to monolayer coating of $SiO_2$, and it was confirmed that an antireflection film having performance usually required for coated lenses for digital camera could be designed.

Conventional Example 2

Figure 8:
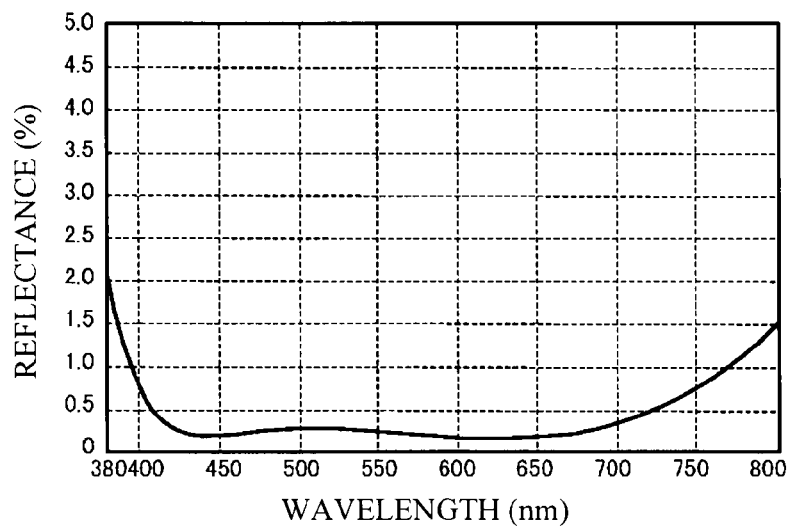
FIG. 8 is a graph showing the relationship between the wavelength and the spectral reflectance in Conventional Example 2.

The constitution of an antireflection film in which a conventional multilayer film (7 layers) was formed on the surface of the core glass is shown in Table 9, and the reflection characteristic thereof is shown in FIG. 8. This characteristic is hereinafter called the multi characteristic 7.

TABLE 9

| | Vapor-Deposited Material | Actual Thickness (nm) |
|---|---|---|
| First Layer | $Al_2O_3$ | 79.24 |
| Second Layer | OH5 | 14.42 |
| Third Layer | $Al_2O_3$ | 26.54 |
| Fourth Layer | OH5 | 79.66 |
| Fifth Layer | $Al_2O_3$ | 12.82 |
| Sixth Later | OH5 | 31.71 |
| Seventh Layer | $MgF_2$ | 96.87 |
| | AIR | |

Example 4

Figure 9:
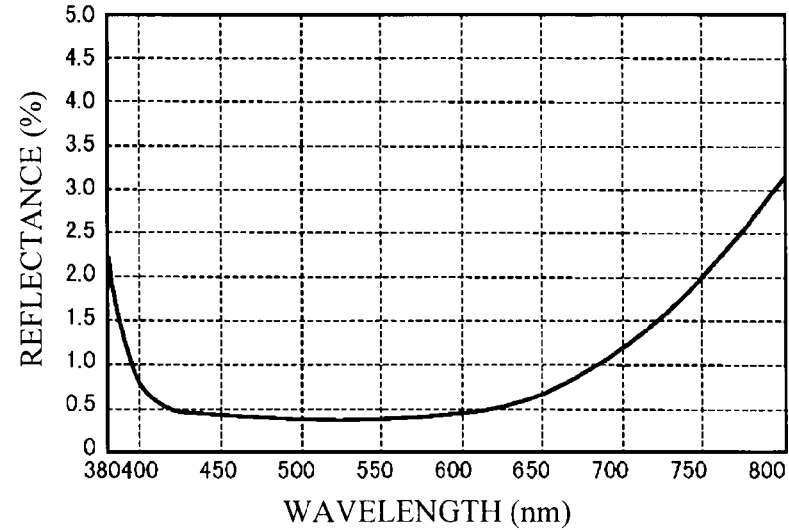
FIG. 9 is a graph showing the relationship between the wavelength and the spectral reflectance in Example 4.

The constitution of an antireflection film designed so as to bring its characteristic near to the multi characteristic 7 and formed on a surface of a core glass so that the outermost surface layer was formed of silicon dioxide ($SiO_2$) is shown in Table 10, and the reflection characteristic thereof is shown in FIG. 9. Further, an antireflection film having the constitution shown in Table 10 and having the outermost layer film thickness of 7 nm was also produced (Example 4-2).

TABLE 10

| | Vapor-Deposited Material | Actual Thickness (nm) |
|---|---|---|
| First Layer | $Al_2O_3$ | 41.58 |
| Second Layer | OH5 | 5.84 |
| Third Layer | $Al_2O_3$ | 41.73 |
| Fourth Layer | OH5 | 41.23 |
| Fifth Layer | $Al_2O_3$ | 16.38 |
| Sixth Later | OH5 | 51.86 |
| Seventh Layer | $SiO_2$ | 89.79 |
| | AIR | |

As shown in FIG. 9, the antireflection film having the above-mentioned constitution had small deviation from the multi characteristic 7, and it was confirmed that an antireflection film having performance usually required for coated lenses for digital camera could be designed.

Conventional Example 3

Figure 10:
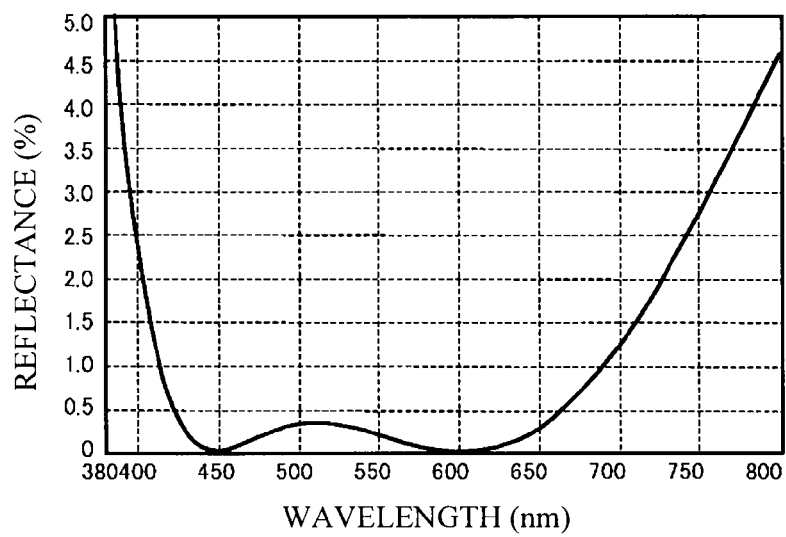
FIG. 10 is a graph showing the relationship between the wavelength and the spectral reflectance in Conventional Example 3.

The constitution of an antireflection film in which a conventional multilayer film (3 layers) was formed on the surface of the core glass is shown in Table 11, and the reflection characteristic thereof is shown in FIG. 10. This characteristic is hereinafter called the multi characteristic 3.

TABLE 11

| | Vapor-Deposited Material | Actual Thickness (nm) |
|---|---|---|
| First Layer | $Al_2O_3$ | 77.32 |
| Second Layer | OH5 | 120.81 |
| Third Layer | $MgF_2$ | 92.02 |
| | AIR | |

Examples 5 and 6

Figure 11:
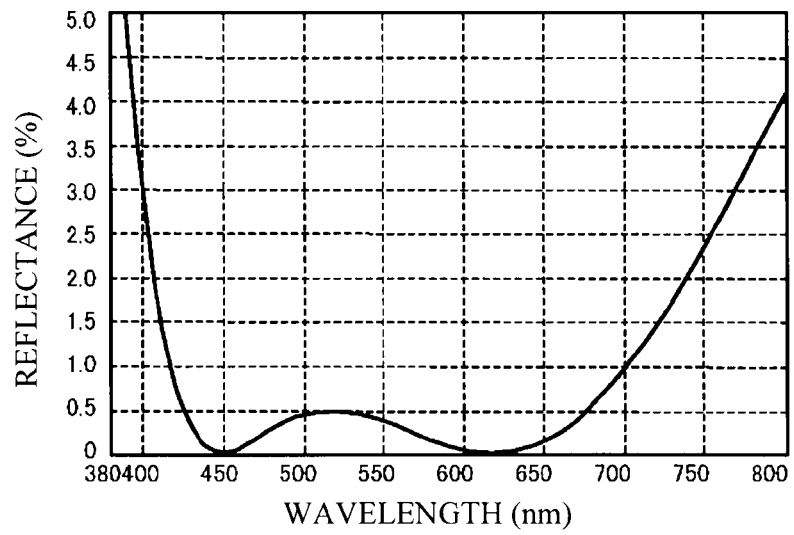
FIG. 11 is a graph showing the relationship between the wavelength and the spectral reflectance in Example 5.
Figure 12:
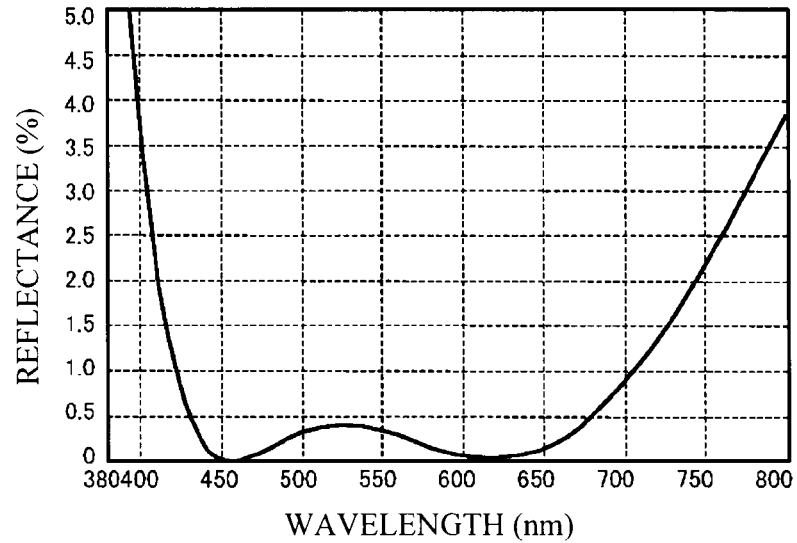
FIG. 12 is a graph showing the relationship between the wavelength and the spectral reflectance in Example 6.

The constitutions of antireflection films designed so as to bring their characteristics near to the multi characteristic 3 and each formed on the surface of the core glass so that the outermost surface layer was formed of silicon dioxide ($SiO_2$) or alumina ($Al_2O_3$) are shown in Tables 12 and 13, and the reflection characteristics thereof are shown in FIGS. 11 and 12, respectively.

TABLE 12

| | Vapor-Deposited Material | Actual Thickness (nm) |
|---|---|---|
| First Layer | $Al_2O_3$ | 77.31 |
| Second Layer | OH5 | 123.01 |
| Third Layer | $MgF_2$ | 75.21 |
| Fourth Layer | $Al_2O_3$ | 10.00 |
| | AIR | |

TABLE 13

| | Vapor-Deposited Material | Actual Thickness (nm) |
|---|---|---|
| First Layer | $Al_2O_3$ | 76.93 |
| Second Layer | OH5 | 122.78 |

TABLE 13-continued

| | Vapor-Deposited Material | Actual Thickness (nm) |
|---|---|---|
| Third Layer | MgF$_2$ | 82.86 |
| Fourth Layer | SiO$_2$ | 10.00 |
| | AIR | |

As shown in FIGS. 11 and 12, the antireflection films having the above-mentioned constitutions had small deviations from the multi characteristic 3, and it was confirmed that an antireflection film having performance usually required for coated lenses for digital camera could be designed.

Conventional Example 4

Figure 13:
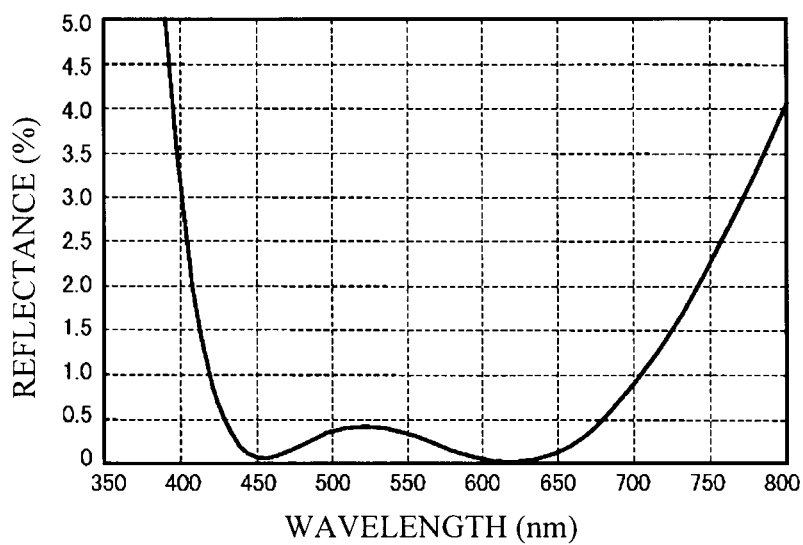
FIG. 13 is a graph showing the relationship between the wavelength and the spectral reflectance in Conventional Example 4.
Figure 14:
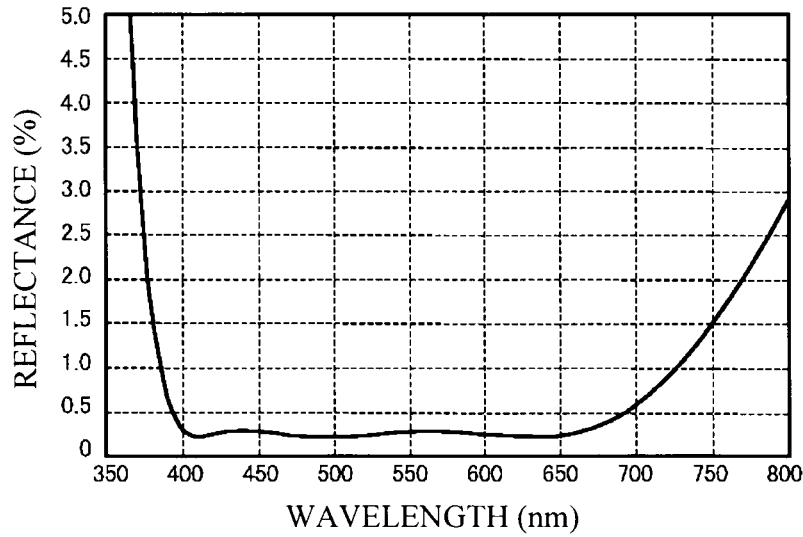
FIG. 14 is a graph showing the relationship between the wavelength and the spectral reflectance in Example 7.
Figure 15:
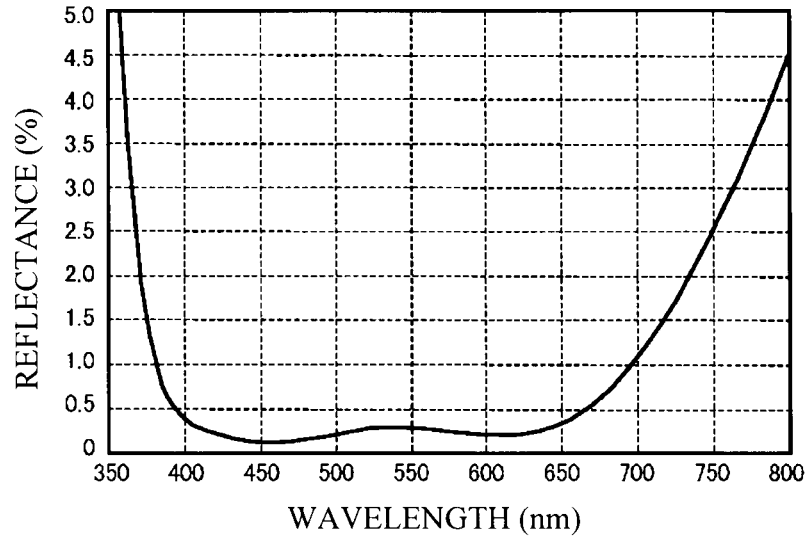
FIG. 15 is a graph showing the relationship between the wavelength and the spectral reflectance in Example 8.
Figure 16:
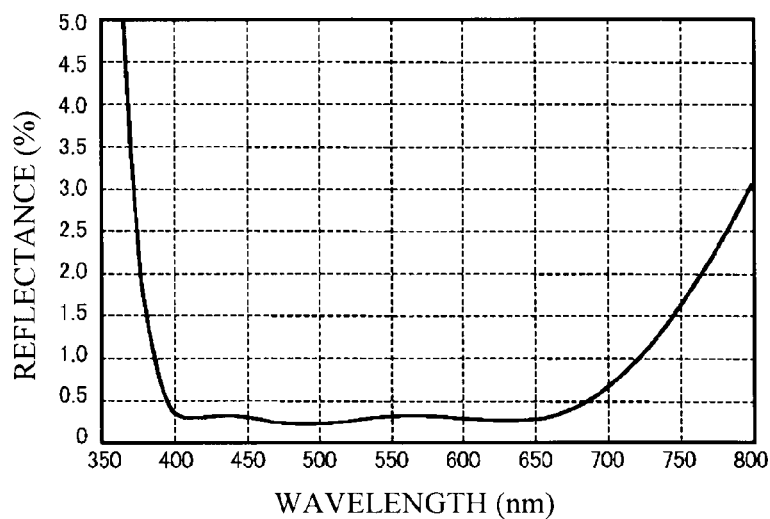
FIG. 16 is a graph showing the relationship between the wavelength and the spectral reflectance in Example 9.
Figure 17:
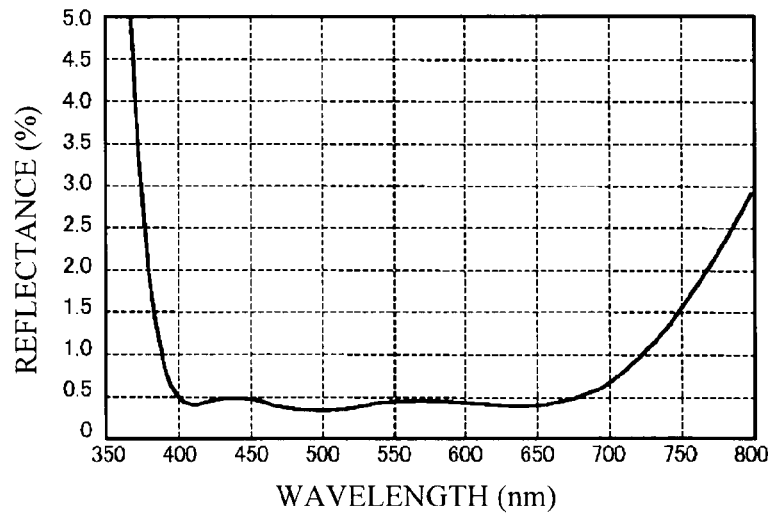
FIG. 17 is a graph showing the relationship between the wavelength and the spectral reflectance in Example 10.
Figure 18:
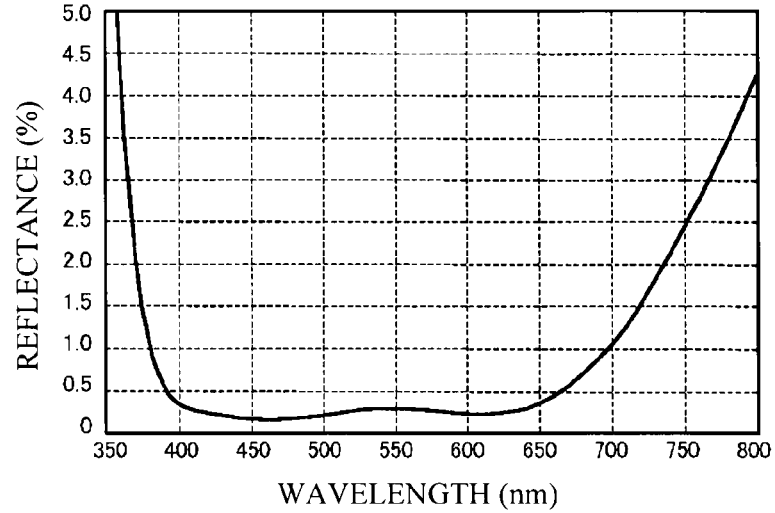
FIG. 18 is a graph showing the relationship between the wavelength and the spectral reflectance in Example 11.

The constitution of an antireflection film in which a conventional multilayer film (5 layers) was formed on the surface of the core glass is shown in Table 14, and the reflection characteristic thereof is shown in FIG. 13. This characteristic is hereinafter called the multi characteristic 5.

TABLE 14

| | Vapor-Deposited Material | Actual Thickness (nm) |
|---|---|---|
| First Layer | Al$_2$O$_3$ | 80.06 |
| Second Layer | OH5 | 56.56 |
| Third Layer | Al$_2$O$_3$ | 7.13 |
| Fourth Layer | OH5 | 54.33 |
| Fifth Layer | MgF$_2$ | 95.01 |
| | AIR | |

Examples 7 to 11

The constitutions of antireflection films designed so as to bring their characteristics near to the multi characteristic 5 and each formed on the surface of the core glass so that the outermost surface layer was formed of yttrium oxide (Y$_2$O$_3$), H4, hafnium oxide (HfO$_2$) or tantalum oxide (Ta$_2$O$_5$) are shown in Tables 15 to 19, and the reflection characteristics thereof are shown in FIGS. 14 to 18, respectively.

TABLE 15

| | Vapor-Deposited Material | Actual Thickness (nm) |
|---|---|---|
| First Layer | Al$_2$O$_3$ | 78.31 |
| Second Layer | OH5 | 51.11 |
| Third Layer | Al$_2$O$_3$ | 13.15 |
| Fourth Layer | OH5 | 44.97 |
| Fifth Layer | MgF$_2$ | 71.32 |
| Sixth Layer | Y$_2$O$_3$ | 10.00 |
| | AIR | |

TABLE 16

| | Vapor-Deposited Material | Actual Thickness (nm) |
|---|---|---|
| First Layer | Al$_2$O$_3$ | 71.44 |
| Second Layer | OH5 | 51.03 |
| Third Layer | Al$_2$O$_3$ | 7.13 |
| Fourth Layer | OH5 | 50.68 |
| Fifth Layer | MgF$_2$ | 69.35 |
| Sixth Layer | H4 | 6.00 |
| | AIR | |

TABLE 17

| | Vapor-Deposited Material | Actual Thickness (nm) |
|---|---|---|
| First Layer | Al$_2$O$_3$ | 77.05 |
| Second Layer | OH5 | 52.22 |
| Third Layer | Al$_2$O$_3$ | 10.11 |
| Fourth Layer | OH5 | 48.46 |
| Fifth Layer | MgF$_2$ | 68.94 |
| Sixth Layer | HfO$_2$ | 8.00 |
| | AIR | |

TABLE 18

| | Vapor-Deposited Material | Actual Thickness (nm) |
|---|---|---|
| First Layer | Al$_2$O$_3$ | 77.70 |
| Second Layer | OH5 | 53.05 |
| Third Layer | Al$_2$O$_3$ | 7.71 |
| Fourth Layer | OH5 | 52.82 |
| Fifth Layer | MgF$_2$ | 63.57 |
| Sixth Layer | HfO$_2$ | 10.00 |
| | AIR | |

TABLE 19

| | Vapor-Deposited Material | Actual Thickness (nm) |
|---|---|---|
| First Layer | Al$_2$O$_3$ | 72.58 |
| Second Layer | OH5 | 51.72 |
| Third Layer | Al$_2$O$_3$ | 7.20 |
| Fourth Layer | OH5 | 50.10 |
| Fifth Layer | MgF$_2$ | 68.41 |
| Sixth Layer | Ta$_2$O$_3$ | 5.63 |
| | AIR | |

As shown in FIGS. 14 to 18, the antireflection films having the above-mentioned constitutions had small deviations from the multi characteristic 5, and it was confirmed that an antireflection film having performance usually required for coated lenses for digital camera could be designed.

Conventional Example 5

Figure 19:
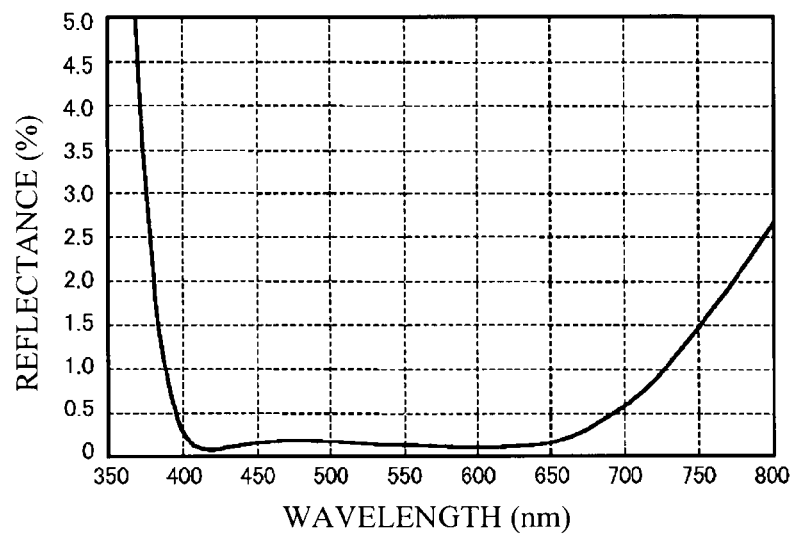
FIG. 19 is a graph showing the relationship between the wavelength and the spectral reflectance in Conventional Example 5.

The constitution of an antireflection film in which a conventional multilayer film (6 layers) was formed on the surface of the core glass is shown in Table 20, and the reflection characteristic thereof is shown in FIG. 19. This characteristic is hereinafter called the multi characteristic 6.

TABLE 20

| | Vapor-Deposited Material | Actual Thickness (nm) |
|---|---|---|
| First Layer | OH5 | 11.39 |
| Second Layer | Al$_2$O$_3$ | 45.25 |
| Third Layer | OH5 | 54.89 |
| Fourth Layer | Al$_2$O$_3$ | 16.63 |
| Fifth Layer | OH5 | 40.74 |
| Sixth Layer | MgF$_2$ | 96.60 |
| | AIR | |

Example 12

Figure 20:
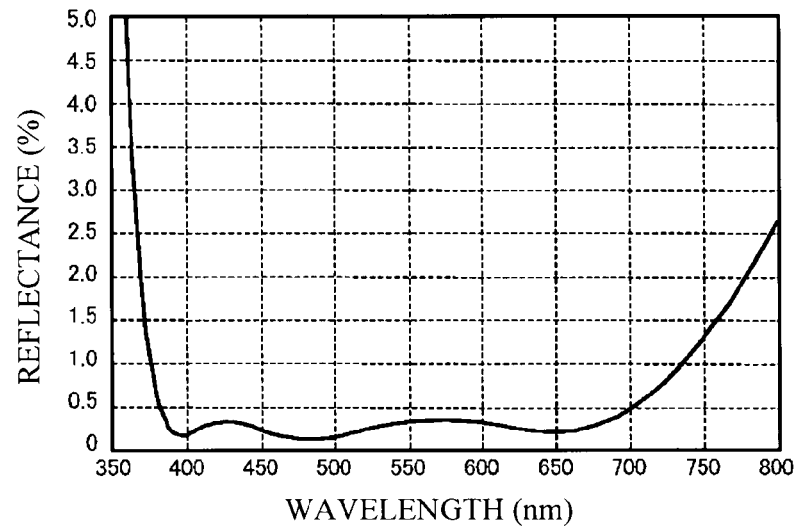
FIG. 20 is a graph showing the relationship between the wavelength and the spectral reflectance in Example 12.

The constitution of an antireflection film designed so as to bring its characteristic near to the multi characteristic 6 and formed on the surface of the core glass so that the outermost surface layer was formed of yttrium oxide (Y$_2$O$_3$) is shown in Table 21, and the reflection characteristic thereof is shown in FIG. 20.

TABLE 21

| | Vapor-Deposited Material | Actual Thickness (nm) |
|---|---|---|
| First Layer | OH5 | 5.53 |
| Second Layer | $Al_2O_3$ | 60.16 |
| Third Layer | OH5 | 52.28 |
| Fourth Layer | $Al_2O_3$ | 15.47 |
| Fifth Layer | OH5 | 40.37 |
| Sixth Layer | $MgF_2$ | 77.35 |
| Seventh Layer | $Y_2O_3$ | 7.06 |
| | AIR | |

As shown in FIG. 20, the antireflection film having the above-mentioned constitution had small deviation from the multi characteristic 6, and it was confirmed that an antireflection film having performance usually required for coated lenses for digital camera could be designed.

Next, for the case where the antireflection film of the invention was formed using a glass of glass material No. 12 having an nd of 1.43425 in Table 3 as a typical example, characteristics thereof were studied below.

Conventional Example 6

Figure 21:
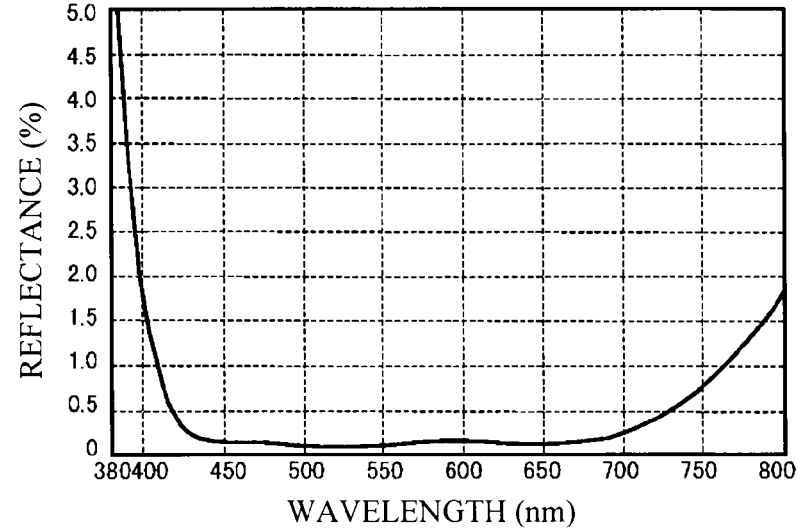
FIG. 21 is a graph showing the relationship between the wavelength and the spectral reflectance in Conventional Example 6.

The constitution of an antireflection film in which a conventional multilayer film (5 layers) was formed on the surface of the core glass is shown in Table 22, and the reflection characteristic thereof is shown in FIG. 21. This characteristic is hereinafter called the multi characteristic 5'.

TABLE 22

| | Vapor-Deposited Material | Actual Thickness (nm) |
|---|---|---|
| First Layer | $Al_2O_3$ | 81.59 |
| Second Layer | OH5 | 60.58 |
| Third Layer | $Al_2O_3$ | 7.31 |
| Fourth Layer | OH5 | 53.94 |
| Fifth Layer | $MgF_2$ | 67.89 |
| | AIR | |

Example 13

Figure 22:
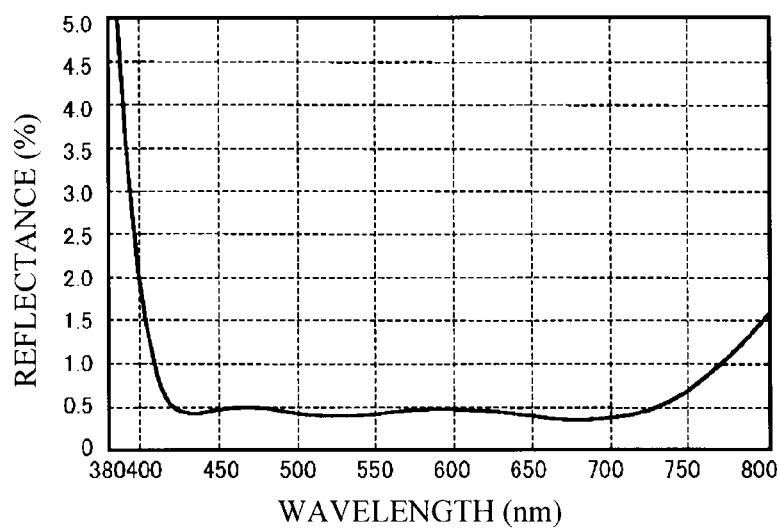
FIG. 22 is a graph showing the relationship between the wavelength and the spectral reflectance in Example 13.

The constitution of an antireflection film designed so as to bring its characteristic near to the multi characteristic 5' and formed on the surface of the core glass so that the outermost surface layer was formed of OH5 is shown in Table 23, and the reflection characteristic thereof is shown in FIG. 22.

TABLE 23

| | Vapor-Deposited Material | Actual Thickness (nm) |
|---|---|---|
| First Layer | $Al_2O_3$ | 81.59 |
| Second Layer | OH5 | 60.58 |
| Third Layer | $Al_2O_3$ | 7.31 |
| Fourth Layer | OH5 | 53.94 |
| Fifth Layer | $MgF_2$ | 67.89 |
| Sixth Layer | OH5 | 9.00 |
| | AIR | |

As shown in FIG. 22, the antireflection film having the above-mentioned constitution had small deviation from the multi characteristic 5', and it was confirmed that an antireflection film having performance usually required for coated lenses for digital camera could be designed.

Conventional Example 7

Figure 23:
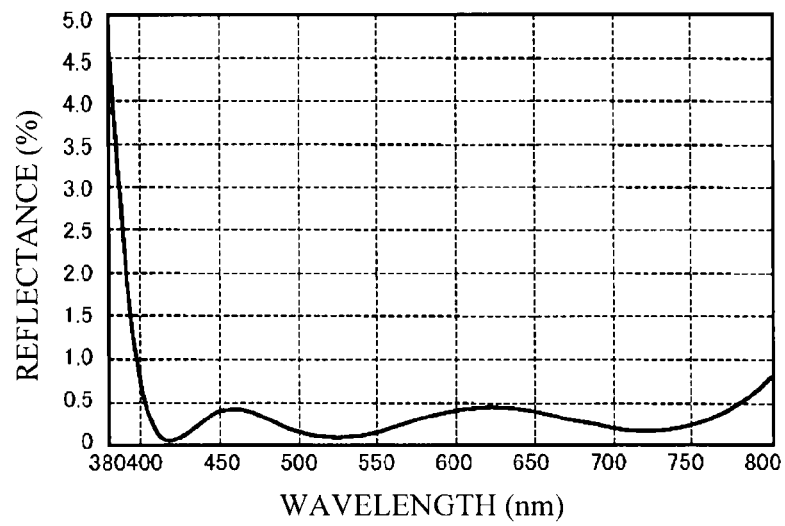
FIG. 23 is a graph showing the relationship between the wavelength and the spectral reflectance in Conventional Example 7.

The constitution of an antireflection film in which a conventional multilayer film (7 layers) was formed on the surface of the core glass is shown in Table 24, and the reflection characteristic thereof is shown in FIG. 23. This characteristic is hereinafter called the multi characteristic 7'.

TABLE 24

| | Vapor-Deposited Material | Actual Thickness (nm) |
|---|---|---|
| First Layer | $Al_2O_3$ | 7.26 |
| Second Layer | OH5 | 8.14 |
| Third Layer | $Al_2O_3$ | 52.46 |
| Fourth Layer | OH5 | 73.26 |
| Fifth Layer | $Al_2O_3$ | 13.16 |
| Sixth Later | OH5 | 36.96 |
| Seventh Layer | $MgF_2$ | 99.31 |
| | AIR | |

Example 14

Figure 24:
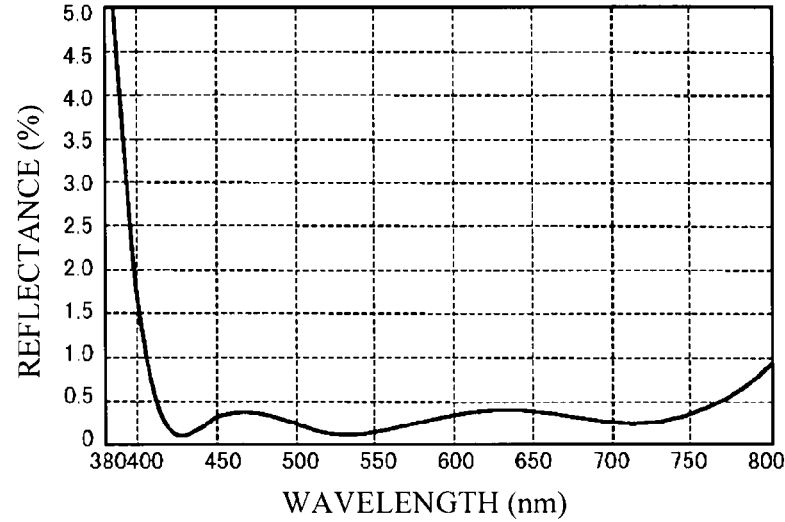
FIG. 24 is a graph showing the relationship between the wavelength and the spectral reflectance in Example 14.

The constitution of an antireflection film designed so as to bring its characteristic near to the multi characteristic 7' and formed on the surface of the core glass so that an outermost surface layer was formed of alumina ($Al_2O_3$) is shown in Table 25, and the reflection characteristic thereof is shown in FIG. 24.

TABLE 25

| | Vapor-Deposited Material | Actual Thickness (nm) |
|---|---|---|
| First Layer | $Al_2O_3$ | 9.07 |
| Second Layer | OH5 | 5.66 |
| Third Layer | $Al_2O_3$ | 57.23 |
| Fourth Layer | OH5 | 78.68 |
| Fifth Layer | $Al_2O_3$ | 8.56 |
| Sixth Later | OH5 | 39.46 |
| Seventh Layer | $MgF_2$ | 80.53 |
| Eighth Layer | $Al_2O_3$ | 10.00 |
| | AIR | |

As shown in FIG. 24, the antireflection film having the above-mentioned constitution had small deviation from the multi characteristic 7', and it was confirmed that an antireflection film having performance usually required for coated lenses for digital camera could be designed.

Conventional Example 8

Figure 25:
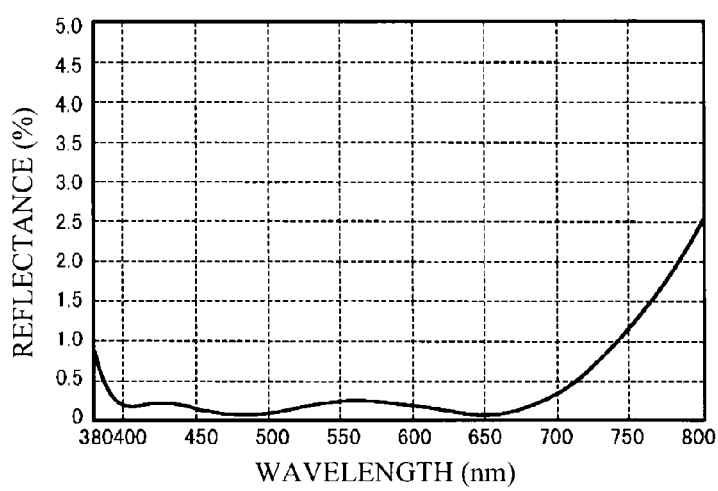
FIG. 25 is a graph showing the relationship between the wavelength and the spectral reflectance in Conventional Example 8.

The constitution of an antireflection film in which a conventional multilayer film (6 layers) was formed on the surface of the core glass is shown in Table 26, and the reflection characteristic thereof is shown in FIG. 25. This characteristic is hereinafter called the multi characteristic 6'.

TABLE 26

| | Vapor-Deposited Material | Actual Thickness (nm) |
|---|---|---|
| First Layer | OH5 | 5.53 |
| Second Layer | $Al_2O_3$ | 58.12 |
| Third Layer | OH5 | 54.15 |
| Fourth Layer | $Al_2O_3$ | 14.88 |
| Fifth Layer | OH5 | 39.33 |
| Sixth Layer | $MgF_2$ | 95.10 |
| | AIR | |

Example 15

Figure 26:
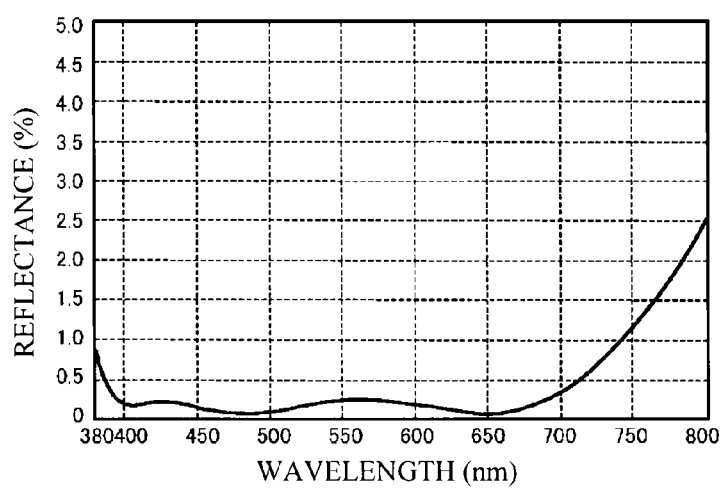
FIG. 26 is a graph showing the relationship between the wavelength and the spectral reflectance in Example 15.

The constitution of an antireflection film designed so as to bring its characteristic near to the multi characteristic 6' and formed on the surface of the core glass so that the outermost surface layer was formed of silicon dioxide ($SiO_2$) is shown in Table 27, and reflection characteristic thereof is shown in FIG. 26.

TABLE 27

|  | Vapor-Deposited Material | Actual Thickness (nm) |
| --- | --- | --- |
| First Layer | OH5 | 5.53 |
| Second Layer | $Al_2O_3$ | 59.24 |
| Third Layer | OH5 | 52.54 |
| Fourth Layer | $Al_2O_3$ | 16.37 |
| Fifth Layer | OH5 | 39.58 |
| Sixth Layer | $MgF_2$ | 79.69 |
| Seventh Layer | $SiO_2$ | 13.43 |
|  | AIR |  |

As shown in FIG. 26, the antireflection film having the above-mentioned constitution had small deviation from the multi characteristic 6', and it was confirmed that an antireflection film having performance usually required for coated lenses for digital camera could be designed.

Example 16

Figure 27:
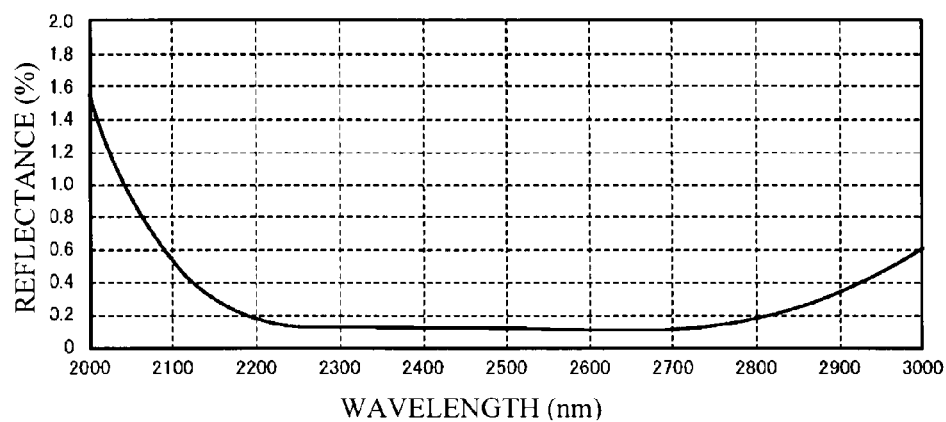
FIG. 27 is a graph showing the relationship between the wavelength and the spectral reflectance in Example 16.

The constitution of an antireflection film designed so as to be usable in a long-wavelength region and formed on the surface of the core glass so that the outermost surface layer was formed of silicon dioxide ($SiO_2$) is shown in Table 28, and the reflection characteristic thereof is shown in FIG. 27.

TABLE 28

|  | Vapor-Deposited Material | Actual Thickness (nm) |
| --- | --- | --- |
| First Layer | OH5 | 57.87 |
| Second Layer | $Al_2O_3$ | 235.71 |
| Third Layer | OH5 | 319.79 |
| Fourth Layer | $SiO_2$ | 423.86 |
|  | AIR |  |

As shown in FIG. 27, the antireflection film having the above-mentioned constitution had a low reflectance in an infrared region, and it was confirmed that an antireflection film having performance usually required for coated lenses for infrared camera could be designed.

Incidentally, OH5 in Tables is a trade name of a vapor deposition material manufactured by Canon Optron Inc., which is a mixture of $ZrO_2$ and $TiO_2$, and H4 is a trade name of a vapor deposition material manufactured by Merck & Co., Inc., which is a mixture of $La_2O_3$ and $TiO_2$.

<Environmental Durability Test>

For the optical elements obtained in Examples, Conventional Examples and Comparative Example, an environmental durability test was performed. The environmental durability test was performed by putting the resulting optical elements in a thermo-hygrostat maintained at 60° C. and 90% RH. A state of occurrences of cloudiness and cracks in the optical elements was visually observed by using a high-intensity light source upon elapses of 125 hours, 250 hours, 500 hours, 750 hours and 1,000 hours after the optical elements were put in the thermo-hygrostat. Further, microscopic observations were also performed together. The results in the case of using the glass of glass material No. 7 having an nd of 1.59216 are shown in Table 29, and the results in the case of using the glass of glass material No. 12 having an nd of 1.43425 are shown in Table 30.

Incidentally, the criteria for determining the cloudiness are as follows.

A: No cloudiness was observed by visual inspection while applying light of the high-intensity light source to pass through.

B: Cloudiness was observed by visual inspection while applying light of the high-intensity light source to pass through, but, no cloudiness was observed by visual inspection made in the same manner by using a 60-watt light bulb as the light source.

C: Cloudiness was observed by visual inspection while applying light of a 60-watt light bulb light source to pass through.

The criteria for determining the cracks, those which are recognized cracks are represented as C.

TABLE 29

|  | Constitution of Antireflection Film | Results after 125 Hours | Results after 250 Hours | Results after 500 Hours | Results after 750 Hours | Results after 1,000 Hours | Overall Evaluation |
| --- | --- | --- | --- | --- | --- | --- | --- |
| Conventional Example 1 | Constitution of Table 4 | C: Cloudiness occurred |  |  |  |  | C |
| Comparative Example 1 | Constitution of Table 5 | A: No change | A: No change | A: No change | A: No change | A: No change | C |
| Example 1 | Constitution of Table 6 | A: No change | A: No change | A: No change | A: No change | A: No change | A |
| Example 2 | Constitution of Table 7 | A: No change | A: No change | A: No change | A: No change | A: No change | A |
| Example 3 | Constitution of Table 8 | A: No change | A: No change | A: No change | A: No change | A: No change | A |
| Conventional Example 2 | Constitution of Table 9 | B: Slight cloudiness | C: Cloudiness occurred |  |  |  | C |
| Example 4 | Constitution of Table 10 | A: No change | A: No change | A: No change | A: No change | A: No change | A |
| Conventional Example 3 | Constitution of Table 11 | B: Slight cloudiness | C: Cloudiness occurred |  |  |  | C |
| Example 5 | Constitution of Table 12 | A: No change | A: No change | A: No change | A: No change | A: No change | A |
| Example 6 | Constitution of Table 13 | A: No change | A: No change | A: No change | A: No change | A: No change | A |
| Conventional Example 4 | Constitution of Table 14 | B: Slight cloudiness | C: Cloudiness occurred |  |  |  | C |
| Example 7 | Constitution of Table 15 | A: No change | A: No change | A: No change | A: No change | A: No change | A |
| Example 8 | Constitution of Table 16 | A: No change | A: No change | A: No change | A: No change | A: No change | A |
| Example 9 | Constitution of Table 17 | A: No change | A: No change | A: No change | A: No change | A: No change | A |
| Example 10 | Constitution of Table 18 | A: No change | A: No change | A: No change | A: No change | A: No change | A |
| Example 11 | Constitution of Table 19 | A: No change | A: No change | A: No change | A: No change | A: No change | A |
| Conventional Example 5 | Constitution of Table 20 | B: Slight cloudiness | C: Cloudiness occurred |  |  |  | C |
| Example 12 | Constitution of Table 21 | A: No change | A: No change | A: No change | A: No change | A: No change | A |

TABLE 29-continued

| | Constitution of Antireflection Film | Results after 125 Hours | Results after 250 Hours | Results after 500 Hours | Results after 750 Hours | Results after 1,000 Hours | Overall Evaluation |
|---|---|---|---|---|---|---|---|
| Example 1-2 | Outermost surface layer thickness of 7 nm in Table 6 | A: No change | B: Slight cloudiness | C: Cloudiness occurred | | | B |
| Example 4-2 | Outermost surface layer thickness of 7 nm in Table 10 | A: No change | B: Slight cloudiness | C: Cloudiness occurred | | | B |

TABLE 30

| | Constitution of Antireflection Film | Results after 125 Hours | Results after 250 Hours | Results after 500 Hours | Results after 750 Hours | Results after 1,000 Hours | Overall Evaluation |
|---|---|---|---|---|---|---|---|
| Conventional Example 6 | Constitution of Table 22 | B: Slight cloudiness | C: Cloudiness occurred | | | | C |
| Example 13 | Constitution of Table 23 | A: No change | A: No change | A: No change | A: No change | A: No change | A |
| Conventional Example 7 | Constitution of Table 24 | B: Slight cloudiness | C: Cloudiness occurred | | | | C |
| Example 14 | Constitution of Table 25 | A: No change | A: No change | A: No change | A: No change | A: No change | A |
| Conventional Example 8 | Constitution of Table 26 | B: Slight cloudiness | C: Cloudiness occurred | | | | C |
| Example 15 | Constitution of Table 27 | A: No change | A: No change | A: No change | A: No change | A: No change | A |
| Example 16 | Constitution of Table 28 | A: No change | A: No change | A: No change | A: No change | A: No change | A |

Examples 1 to 16 of Tables 29 and 30 have shown that when the outermost surface layer is formed of the material having low reactivity with phosphoric acid, for example, at least one selected from the group consisting of $SiO_2$, $Al_2O_3$, $TiO_2$, $ZrO_2$, $Y_2O_3$, $HfO_2$, $La_2O_3$, and $Ta_2O_5$, good environmental durability is achieved. Further, it has also been found that no change in appearance is observed even after an elapse of 1,000 hours by adjusting the film thickness, which makes it possible to extremely improve environmental durability.

Incidentally, when the film thickness was decreased, the optical element started to be clouded at a somewhat early stage, although it was effective. When the film thickness was increased (for example, exceeding 450 nm), cracks became liable to occur on the surface of the optical element. On the other hand, when the outermost surface layer was formed of $MgF_2$, all deteriorated in appearance after an elapse of 250 hours or less, although there were some differences depending on the type of glass material.

The same test was performed for the glass materials (Nos. 1 to 6 and 8 to 11) other than No. 7 and No. 12. As a result, a similar tendency was shown, although there were some differences. Incidentally, the same test was performed by replacing the samples with coated lenses prepared by press molding the glass materials (Nos. 1 to 12). As a result, similar results were obtained.

While the invention has been described in detail and with reference to specific embodiments thereof, it will be apparent to one skilled in the art that various changes and modifications can be made therein without departing from the spirit and scope thereof.

The present application is based on Japanese Patent Application No. 2009-152182 filed on Jun. 26, 2009, and the entire contents are incorporated herein by reference.

What is claimed is:

1. An optical element comprising: a optical glass made of a phosphate glass or a fluorophosphate glass; and an optically functional film formed on a surface of the optical glass,
   wherein the optically functional film comprises a first layer and an outermost surface layer made of different materials, and the outermost surface layer thereof is made of a material(s) having low reactivity with phosphoric acid,
   wherein said optical glass is exposed at a side surface thereof.

2. The optical element according to claim 1,
   wherein said first layer is at least one oxide film selected from the group consisting of $Al_2O_3$ and a mixture of $ZrO_2$ and $TiO_2$.

3. The optical element according to claim 1, wherein the outermost surface layer of the optically functional film is an oxide film.

4. The optical element according to claim 3, wherein the outermost surface layer is an oxide film which is made of at least one material selected from the group consisting of $SiO_2$, $Al_2O_3$, $Y_2O_3$, $La_2O_3$, $HfO_2$, $Ta_2O_5$, $TiO_2$, $ZrO_2$ and $Nb_2O_5$.

5. The optical element according to any one of claims 2 to 4, wherein the outermost surface layer of the optically functional film has a film thickness of 5 nm to 450 nm.

6. The optical element according to claim 1, wherein said optical glass comprises:
   45 to 53% by mass $P_2O_5$,
   7 to 37% by mass ZnO,
   0 to 9% by mass $K_2O$,
   0 to 10% by mass $Na_2O$,
   1 to 4% by mass $Li_2O$,
   1 to 10% by mass $Al_2O_3$,
   0 to 10% by mass BaO,
   0 to 5% by mass CaO, and
   0 to 2% by mass of each of $B_2O_3$, $SiO_2$, $ZrO_2$, $Sb_2O_3$, SrO, $La_2O_3$, MgO, $WO_3$ and $Nb_2O_5$.

7. The optical element according to claim 1, wherein said optical glass comprises:
   36 to 48% by mass $P_2O_5$,
   4 to 11% by mass $B_2O_3$,
   3 to 5% by mass $Li_2O$,
   15 to 38% by mass BaO,
   2 to 9% by mass CaO,
   0 to 7% by mass MgO,
   0 to 8% by mass SrO,
   2 to 4% by mass $Al_2O_3$, and
   0 to 4% by mass of each of ZnO, $La_2O_3$ and $Gd_2O_3$.

8. The optical element according to claim 1, wherein said optical glass comprises:
0 to 7% by mass $P_2O_5$,
0 to 2% by mass NaF,
12 to 32% by mass $AlF_3$,
5 to 11% by mass $MgF_2$,
15 to 17% by mass $CaF_2$,
19 to 26% by mass $SrF_2$,
0 to 27% by mass $Al(PO_3)_3$, and
14 to 15% by mass $BaF_2$.

9. A method for producing the optical element according to claim 1 comprising forming an optically functional film comprising a first layer and an outermost surface layer made of different materials and sequentially laminated, on a surface of an optical glass made of a phosphate glass or a fluorophosphate glass,
wherein an outermost surface layer of the optically functional film is made of a material(s) having low reactivity with phosphoric acid.

10. The method for producing an optical element according to claim 9, wherein the optically functional film is formed by a vacuum vapor deposition film forming method using an electron gun evaporation source.

11. The method for producing an optical element according to claim 10, wherein the optically functional film is formed by a plasma-assist or ion-assist vapor deposition film forming method using an electron gun evaporation source.

12. The method for producing an optical element according to claim 9, wherein the optically functional film is formed by a sputtering film forming method.

13. The method for producing an optical element according to any one of claims 9 to 12, wherein the optical glass made of a phosphate glass or a fluorophosphate glass is obtained by softening an optical glass forming material by heating, and pressing it with a mold.

* * * * *